United States Patent [19]

van der Lely et al.

[11] 4,433,734

[45] Feb. 28, 1984

[54] SOIL CULTIVATING IMPLEMENT

[75] Inventors: Ary van der Lely, Maasland; Cornelis J. G. Bom, Rozenburg, both of Netherlands

[73] Assignee: C. Van der Lely N.V., Maasland, Netherlands

[21] Appl. No.: 379,291

[22] Filed: May 18, 1982

Related U.S. Application Data

[62] Division of Ser. No. 181,422, Aug. 26, 1980, Pat. No. 4,344,490.

[30] Foreign Application Priority Data

Sep. 5, 1979 [NL] Netherlands .......................... 7906631

[51] Int. Cl.³ ............................................. A01B 33/06
[52] U.S. Cl. ....................................... 172/68; 172/112
[58] Field of Search ................. 172/112, 68, 113, 609, 172/49.5, 72, 552

[56] References Cited

U.S. PATENT DOCUMENTS

| | | | |
|---|---|---|---|
| 2,963,095 | 12/1960 | Oehler | 172/178 |
| 4,088,083 | 5/1978 | Dail | 172/72 |
| 4,095,652 | 6/1978 | Lely | 172/49.5 |
| 4,171,725 | 10/1979 | Saugstad | 172/68 |

*Primary Examiner*—Richard J. Johnson
*Attorney, Agent, or Firm*—Penrose Lucas Albright

[57] ABSTRACT

A soil working implement has a row of soil working tools that displace soil rearwardly and laterally. A side-plate is pivoted to each side of the implement frame and positioned adjacent the outer ends of the row to arrest the lateral movement of the soil. An elongated supporting roller is located to the rear of the row to support the implement and further work the soil. Each side-plate has a lower rim that rides along the ground and a guide element is attached to the rear of the side-plate to extend inwardly towards an outer roller end. The element is preferably a blade that is inclined to displace soil arrested by the side-plate and prevent ridging. The blade can be integral or attached to the rim.

6 Claims, 9 Drawing Figures

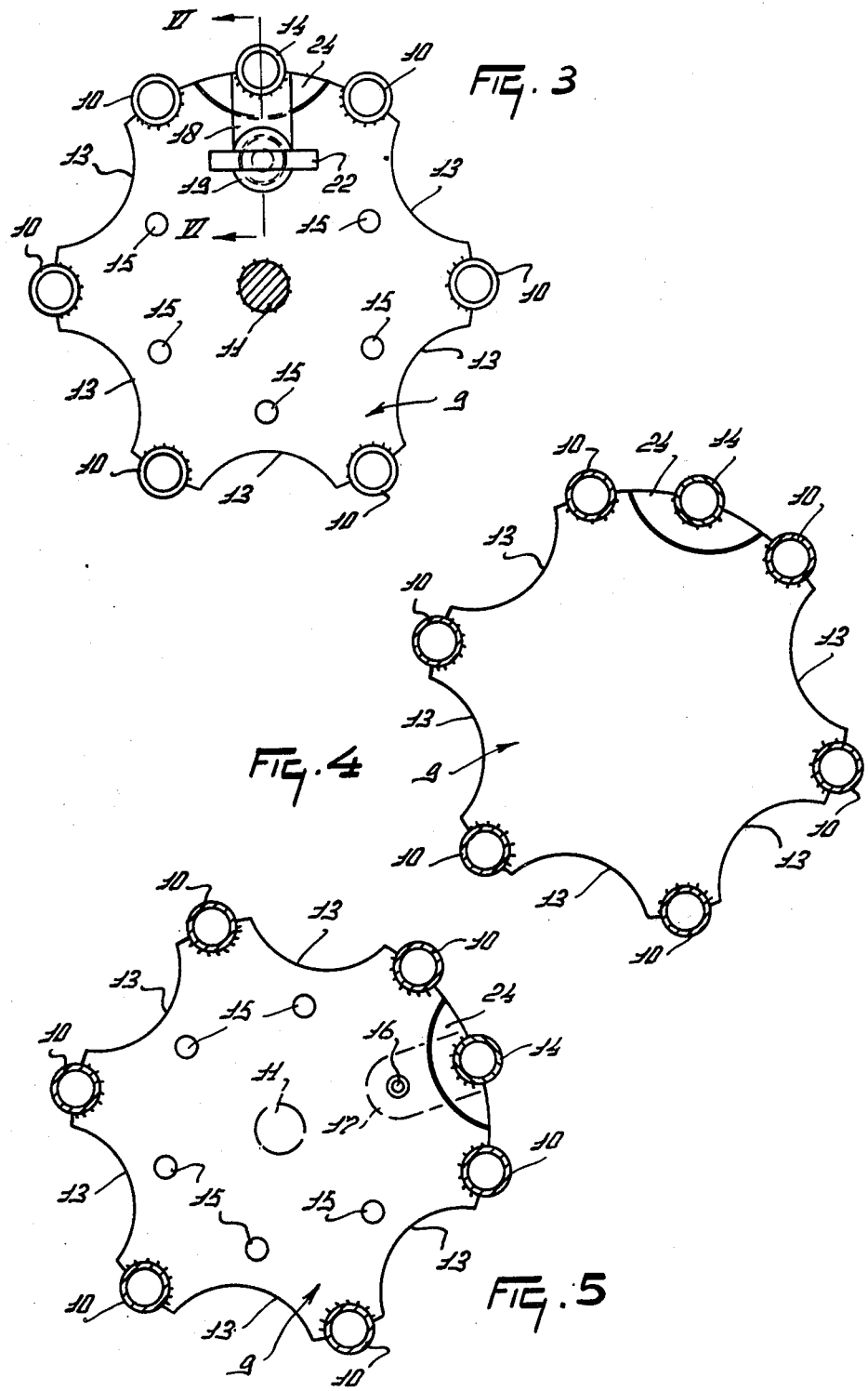

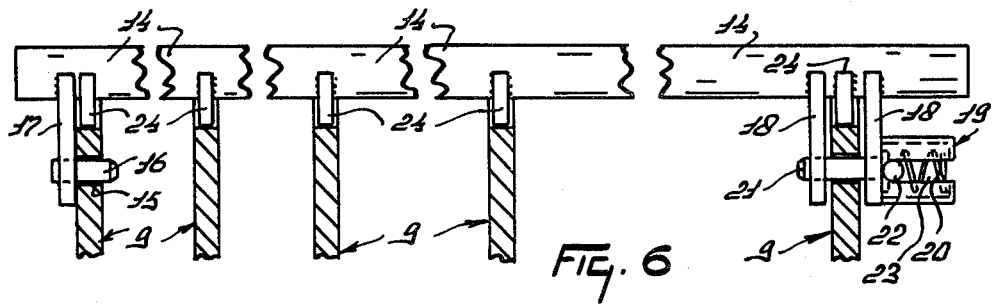
FIG. 6
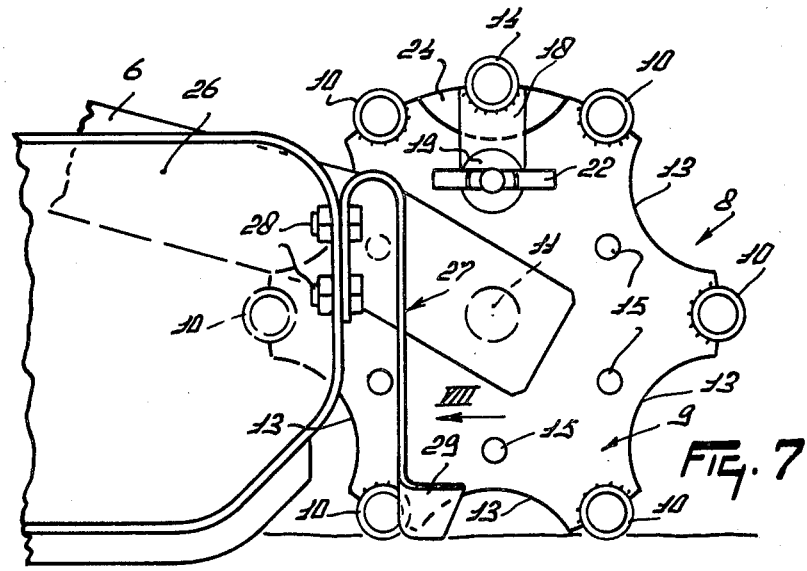
FIG. 7
FIG. 8
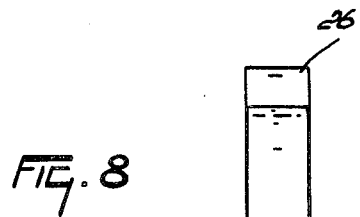
FIG. 9
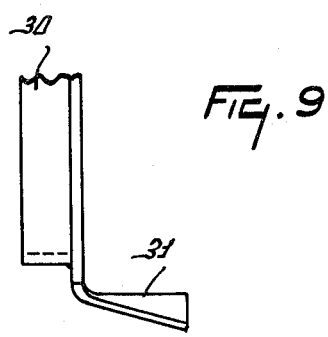

SOIL CULTIVATING IMPLEMENT

RELATED APPLICATION

This application is a division of Ser. No. 181,422 filed Aug. 26, 1980 which issued as U.S. Pat. No. 4,344,490 on Aug. 17, 1982.

SUMMARY OF THE INVENTION

The invention relates to a soil cultivating implement comprising a plurality of soil working members that are arranged in a transverse row in side-by-side relationship, drive means being provided for rotating said soil working members about vertical or substantially vertical shafts, that define axes of rotation for the said soil working members, a height adjustable roller being provided to the rear of said soil working members, which roller extends substantially throughout the working width of the machine, a side-plate being arranged near at least one outermost soil working member, the said side-plate extending in upward direction and substantially parallel to the direction of intended travel of the implement.

With implements of the above mentioned kind the depths to which the said soil working members are working the soil can be set by means of the height-adjustable roller. During operation the implement is supported from the ground surface principally by the roller, whereby there is a tendency for the opposite ends of the roller to dig into the cultivated earth which causes the narrow strip of soil between an end of the roller and a side-plate to be pushed upwardly to a small extent which is undesirable in particular when preparing seedbeds. The accumulations of soil which would thus be caused at these locations are prevented in accordance with the invention by the provision of guide means at least near rear of side-plates, which guide means at least partly extend in the direction of a roller end.

For a better understanding of the invention, and to show how the same may be carried into effect, reference will now be made, by way of example, to the accompanying drawings, in which:

BRIEF DESCRIPTION OF THE DRAWINGS

FIG. 6 is a section taken on the line VI—VI in FIG. 3, FIG. 7 is a side elevation as seen in the direction indicated by an arrow VII in FIG. 2, FIG. 8 is a broken rear elevation as seen in the direction indicated by an arrow VIII in FIG. 7, and FIG. 9 is a scrap plan view illustrating an alternative form of shield plate of the implement carrying an alternative form of scraping element.

DESCRIPTION OF THE PREFERRED EMBODIMENTS

Figure 1:
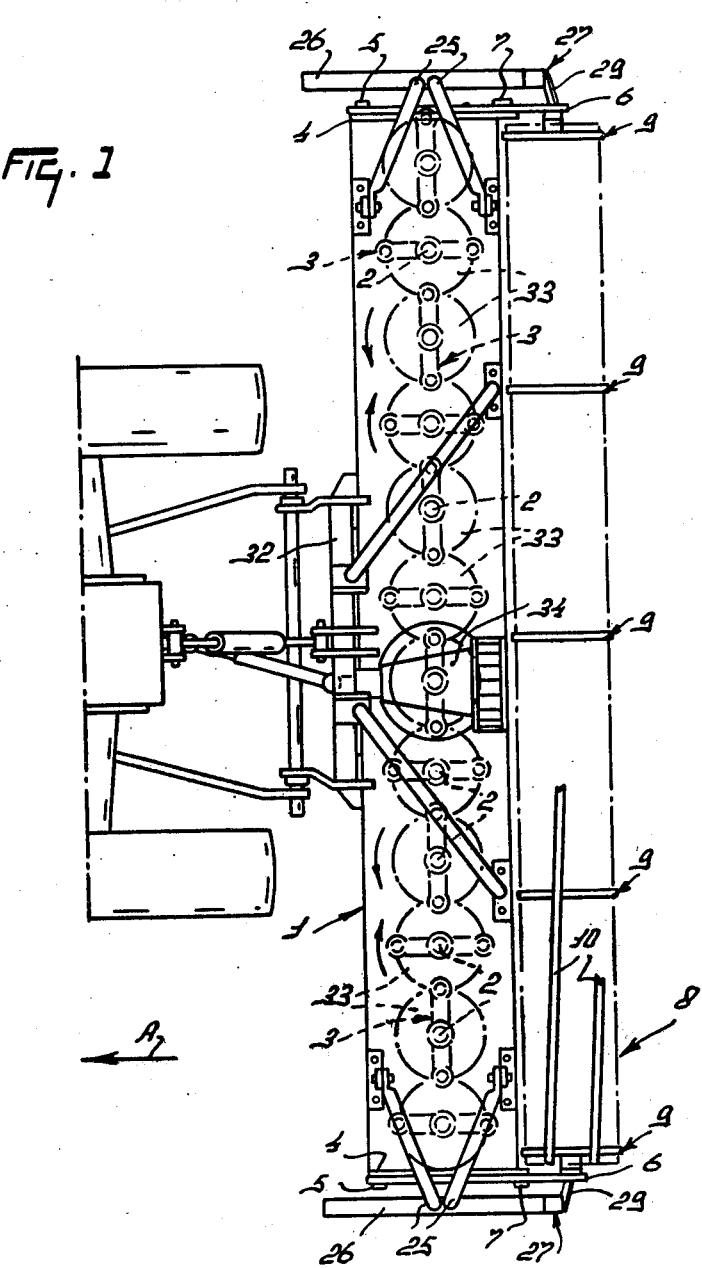
FIG. 1 is a plan view of a soil cultivating implement in accordance with the invention shown connected to the rear of an agricultural tractor.
Figure 2:
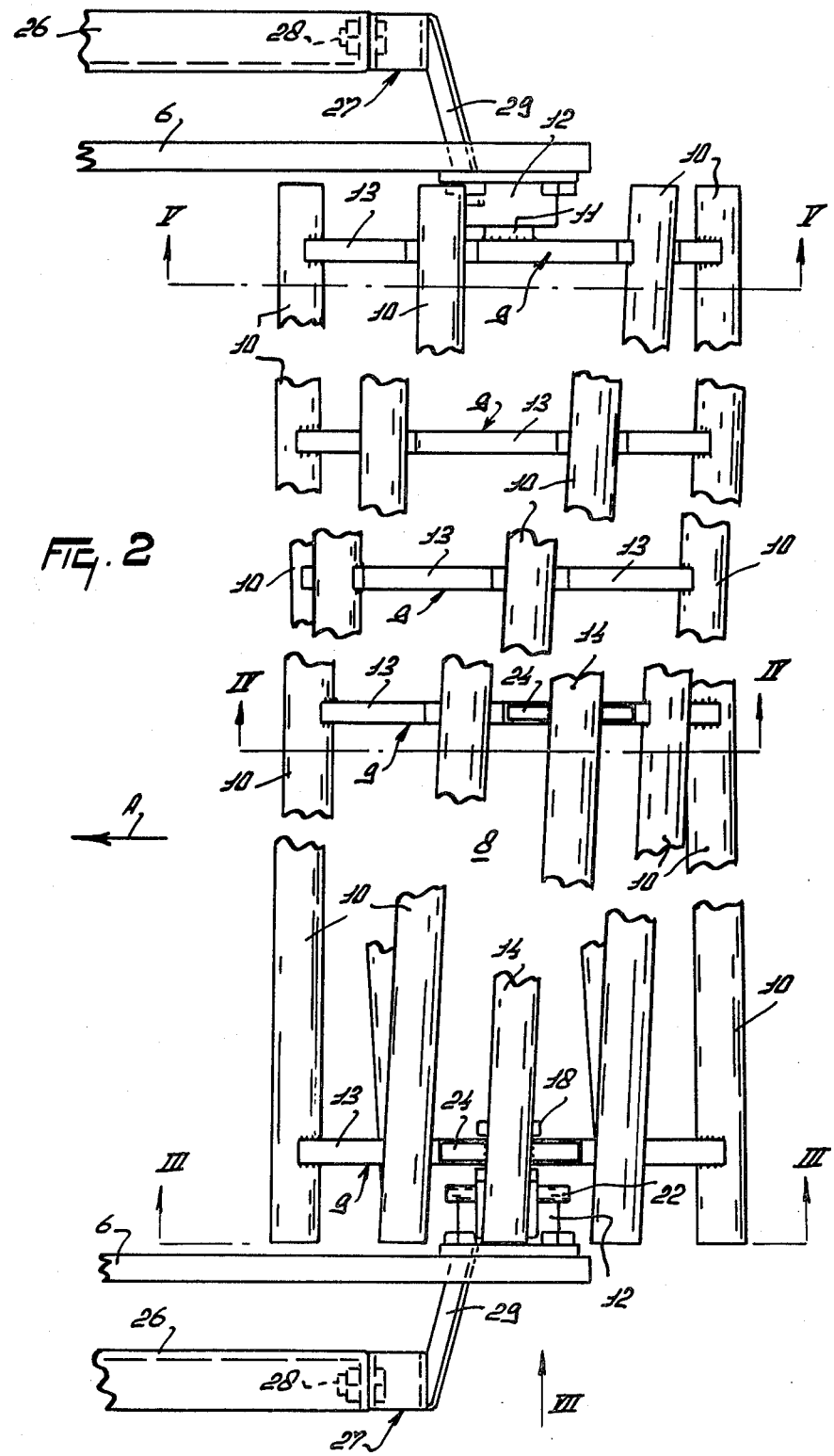
FIG. 2 is a plan view, to a considerably enlarged scale, showing in broken sequence details of the construction of a roller which is located at the rear of the implement of FIG. 1, FIGS. 3, 4 and 5 are sections taken on the lines III—III, IV—IV, and V—V, respectively, in FIG. 2.

Referring to the accompanying drawings, the soil cultivating implement that is illustrated therein has a hollow box-section frame portion 1 that extends substantially horizontally transverse and usually, as illustrated, substantially horizontally perpendicular to the intended direction of operative travel of the implement which is indicated by an arrow A in FIGS. 1 and 2 of the drawings. The hollow frame portion 1 rotatably supports a plurality (for example, twelve) of non-horizontal shafts 2 which will usually be vertically or substantially vertically disposed, said shafts 2 being arranged in a single row that is parallel to the transverse length of the frame portion 1 with their longitudinal axes (axes of rotation) spaced apart from one another at regular intervals which advantageously, but not essentially, have magnitudes of substantially twenty-five centimeters. Each shaft 2 projects downwardly from beneath the bottom of the hollow frame portion 1 and is there provided with a corresponding soil working member 3 which comprises a diametrically opposite pair of rigid tines that are firmly but releasably secured to a horizontal or substantially horizontal carrier or support. The two tines of each rotary soil working member 3 are spaced apart from one another by a little greater distance than the regular spacing between the longitudinal axes of the shafts 2 so that, when the implement is in operation, the soil working members 3 cultivate overlapping strips of soil so that a single broad strip of worked soil results which will have, with the illustrated total of twelve soil working members 3 and the preferred spacing of substantially twenty-five centimeters between their axes of rotation, a width of substantially three meters. It is emphasized that a total of twelve rotary soil working members 3 is by no means mandatory and that the invention is equally applicable to implements which have greater or lesser numbers of the soil working members 3. The opposite ends of the hollow frame portion 1 are closed by corresponding substantially vertically disposed side plates 4 each of which is of approximately sector-shaped configuration, the rearmost edge thereof, with respect to the direction A, being of greater vertical extent than is the front thereof and said rearmost edge projecting a short distance behind the hollow body of the frame portion 1 with respect to the direction A. The fronts of the two side plates 4 carry substantially horizontally aligned pivots 5 about which corresponding arms 6 are turnable upwardly and downwardly alongside the respective plates 4, said arms 6 extending generally rearwardly from their pivots 5 with respect to the direction A so as to project some distance behind the rear edges of the side plates 4. The rear edges of the side plates 4 that project behind the hollow body of the frame portion 1 are formed with curved rows of holes in which each hole is equidistant from the axis that is defined by the pivots 5 and each arm 6 is formed with at least one hole at the same distance from that axis. Accordingly, the holes in the arms 6 can be brought into register with a selected one of the holes in the side plates 4 by turning said arms 6 upwardly and downwardly, as may be required, about the pivots 5 and locking bolts 7 are provided for entry through the hole which has just been to retain the arms 6 firmly but releasably in a desired angular setting about the axis which is defined by the pivots 5.

An open-work ground roller 8 is rotatably mounted between substantially horizontally aligned bearings that are carried at the rearmost ends of the two arms 6. The roller 8 comprises a plurality (such as five) of regularly spaced apart carrier discs 9 which are all vertically or substantially vertically disposed in parallel relationship with each other and parallel or substantially parallel relationship with the direction A, it being noted that two of the carrier discs 9 are located very close to the opposite axial ends of the roller 8. As can be seen in FIGS. 3, 4, 5 and 7 of the drawings, the five carrier discs 9 are rigidly interconnected by six elongate elements 10 that are in the form of metal tubes of circular cross-section. The elements 10 are welded or otherwise rigidly secured in relatively small and substantially semicircular recesses which are formed in the circumferences of the carrier discs 9 at regular 60° intervals around the center of each such disc 9. As can be seen best in FIGS. 1 and 2 of the drawings, each carrier disc 9 is turned through substantially 18° about its center relative to its immediate neighbor or in the roller 8 with the result that the six elongate elements 10 all extend lengthwise of the roller 8 but are wound helically around its longitudinal axis (axis of rotation) to some extent. The outer sides of the two carrier discs 9 which are at substantially the opposite ends of the roller 8 rigidly carry short centrally disposed and axially extending stub shafts 11 which stub shafts are rotatably received in the corresponding previously mentioned substantially horizontally aligned bearings which are carried at the rearmost ends of the two arms 6, these bearings being given the reference 12 in FIG. 2 of the drawings.

The periphery of each carrier disc 9 is formed, centrally between each successive pair of elongate elements 10, with a relatively large crescent-shaped recess 13, there thus being six of the larger crescent-shaped recesses 13 at regular intervals around the periphery of each disc 9. In order to enable an open-work ground roller to be able to co-operate effectively with soils of different kinds and in various conditions (for example, light, sandy soil in a dry condition or heavy, clay soil in a wet condition), it is desirable to be able to augment or decrease the number of elongate elements which skeletally define the cylindrically curved surface of the roll and, as briefly discussed at the beginning of this specification, it would be a considerable practical advantage to be able to add, and remove, auxiliary elongate elements of the roller both quickly and easily. Accordingly, and in accordance with the invention, an additional auxiliary elongate element 14 (FIGS. 2 to 7 of the drawings) can be installed so as to extend into each of the six crescent-shaped recesses 13 of each carrier disc 9. However, it is particularly noted that each of the indicated FIGS. of the drawings shows only one auxiliary elongate element 14 since the formation, installation and removal of each auxiliary element 14 is the same. Each auxiliary elongate element 14 is of the same basic formation as each fixed elongate element 10, that is to say, it is of tubular metal formation having a circular or substantially circular cross-section. In order to fix the auxiliary elongate elements 14 in their operative positions, each of the two carrier discs 9 which is at substantially one of the opposite axial ends of the roller 8 is formed with six holes 15 which holes are on corresponding imaginary radial lines that connect the center of the carrier disc 9 concerned and the centers of the six crescent-shaped recesses 13, each holes 15 being spaced radially inwardly from the center of the recess 13 concerned by a predetermined distance. Each auxiliary elongate element 14 is provided, close to one of its ends, with a support lug 17 (FIGS. 5 and 6) which support lug 17 carries a pin 16 that can be entered into one of the holes 15 in the corresponding carrier disc 9 that is at one axial end of the roller 8. Close to its opposite axial end, the auxiliary elongate element 14 under discussion carries a pair of parallel but spaced apart tongues 18 which tongues are formed with aligned holes which, when the element 14 under consideration is installed in its operative position, will register with one of the holes 15 in the carrier disc 9 that is at substantially the opposite axial end of the roller 8 from the disc which receives the corresponding pin 16. That side of the outer one of the two tongues 18 which is nearest to the end of the auxiliary elongate element 14 carries a housing 19 in which a helical compression spring 20 is so disposed as to urge a retaining pin 21 towards the left as seen in FIG. 6 of the drawings through the aligned holes in the two tongues 18 and, when the element 14 concerned is installed in its operative position, through the appropriate hole 15 that is formed in the "end" carrier disc 9 that is sandwiched between said tongues 18. The retaining pin 21 is of T-shaped configuration, the upright of the T being the pin proper while the crossbar of the T is in the form of a handle 22 which projects through diametrically opposed slots 23 that are formed in opposite sides of the housing 19. The strength of the spring 20 is such that, while it will reliably maintain the pin 21 in its operative position, the handle 22 can readily be operated manually to withdraw said pin 21 into the housing 19 against the action of that spring. Although detracting somewhat from the ease and rapidity of installation and removal of each auxiliary elongate element 14, the housings 19 and pins 21 could, if preferred, be replaced by single retaining bolts.

Each auxiliary elongate element 14 is provided, at appropriate locations along the length thereof, with five substantially sector-shaped stop lugs 24 which stop lugs 24 are welded or otherwise rigidly secured to each element 14 in such positions that, as can be seen best in FIG. 6 of the drawings, they will fit snugly in the matchingly shaped recesses 13 in the peripheries of the successive carrier disc 9. It will be remembered that the fixed tubular elongate elements 10 are of helical configuration so that, of course, the auxiliary elongate elements 14 must be of similar configuration. This enables them to be installed as shown best in FIG. 6 of the drawings with some resilient pre-stressing. When installing each element 14, the corresponding pin 16 is first inserted in the appropriate hole 15 and then said element 14 is resiliently deformed to a small extent by the person performing the installation until the spring-loaded retaining pin 21 or alternative single bolt can be placed in its appointed retaining positions. Under these circumstances, some or all of the stop lugs 24 will be pressed firmly into engagement with the concave curved surface of the matchingly shaped recesses 13.

It is stressed again that only one of the auxiliary elongate elements 14 is shown in the drawings although, in the embodiment that is being described, up to six of them may optionally be included in the roller 8. This will depend upon the nature and condition of the soil that is to be dealt with. Purely for example, the roller 8 will operate most effectively on light sandy soil that is in dry condition with as many of the auxiliary elongate elements 14 as possible installed so that the implement should be used with all six of the auxiliary elements 14 added to the roller 8 so that said roller 8 has a total of twelve elongate elements comprising the six fixed elements 10 and the six readily releasable elements 14. When heavy soil, for example clay soil, in a wet condition is to be dealt with, there is a danger of the roller 8 becoming clogged internally with mud if it has too many of the elongate elements and it is then best to employ it with all of the auxiliary elements 14 removed. It is, of course, possible to employ, for example, three of the six auxiliary elements 14 in conditions which are intermediate between the two extremes which have just been briefly mentioned.

Substantially vertically disposed side-plates 26 are arranged immediately beyond the opposite ends of the single row of rotary soil working members 3, each sideplate 26 being fastened to a corresponding pair of arms 25 which are pivotable upwardly and downwardly about a substantially horizontal axis that is parallel or substantially parallel to the direction A and that is afforded by a respective pair of pivots mounted on top of the hollow frame portion 1 at locations close to the front and to the rear of that frame portion. Each sideplate 26 has a perpendicularly projecting rim along at least its lower edge which rim can slide over the ground surface when the implement is in use. The pivotal mounting of the sideplates 26 via their arms 25 enables the plates to turn upwardly and downwardly, as may be required, to match undulations in the surface of the soil that is being cultivated by the implement. The sideplates 26 cooperate with the rotary soil working members 3 at the opposite ends of the row of those members in working the soil at the margins of the broad strip of cultivated land that is produced by the implement substaltially as thoroughly as is the soil which is nearer to the center of the broad strip. Additionally, the sideplates 26 substantially prevent any ridging of soil at the margins of the broad strip that is worked by the implement and stop stones and the like from being flung laterally of the path of travel of the implement by the rapidly moving tines of the soil working members 3 thus greatly reducing the danger of injury to bystanders or damage to property that might possibly otherwise be caused by such rapidly ejected stones and the like.

When the implement that has been described is in operation, the maximum depth to which the tines of the rotary soil working members 3 can penetrate into the ground is set, before work commences, by adjusting the level of the axis of rotation of the roller 8 either upwardly or downwardly relative to the frame portion 1 and members 3 by turning the arms 6 upwardly or downwardly, as may be required, about the aligned pivots 5, employing the locking bolts 7 to retain arms 6 in a selected setting as long as required. The implement is supported from the ground surface principally by the roller 8 but, of course, also by the soil working members 3 themselves. There is a tendency for the opposite ends of the roller 8, which extends throughout substantially the whole of the combined working width of the soil working members 3, to dig into the cultivated earth and this causes the narrow strips of soil between the ends of the roller 3 and the sideplates 26 to be pushed upwardly to a small extent, despite the provision of said plates 26, this being undesirable under some working circumstances. The accumulations of soil which would thus be caused at these locations are prevented, or very greatly reduced, by connecting a guide element or scraper 27 to the rim at the rear of each side-plate 26 by a corresponding pair of bolts 28 (FIGS. 2 and 7). The shapes of the symmetrically identical guide elements or scrapers 27 can be seen in FIGS. 2, 7 and 8 of the drawings and they are formed from a resilient material which is conveniently spring steel. It will be seen from FIG. 7 of the drawings that the portion of each element 27 which is secured to the corresponding shield plate rim by the bolts 28 is connected by a 180° bend to a substantially vertically downwardly directed portion which terminates, at its lower end, in an inclined blade 29 the general plane of which is inclined to the horizontal ground surface at an angle which is preferably not less than substantially 60°. Each blade 29 can thus spread any soil which accumulates as briefly described above rearwardly over its upper surface and also laterally to some extent. It will be seen from the drawings that each guide element or scraper 27 can readily be formed from a single strip of spring steel or other resilient material.

FIG. 9 of the drawings illustrates an alternative construction in which a guide element or blade 31 is formed integrally with the lower rim of a side-plate 30 that is manufactured from a single metal plate by a punching operation. Although differently supported, the guide element or blade 31 has substantially the same shape and disposition as the blade 29 that has been described above.

The front of the hollow frame portion 1 is provided, midway between the planes of its two side plates 4, with a coupling member or trestle 32 that is of substantially triangular configuration as seen in either front or rear elevation. The coupling member or trestle 32 is constructed and arranged for connection to the three-point lifting device or hitch at the rear of an agricultural tractor or other operating vehicle of the implement in a manner which is generally known per se and which is illustrated somewhat diagrammatically in FIG. 1 of the drawings. The shafts 2 are provided, inside the hollow frame portion 1, with corresponding straight-toothed or spur-toothed pinions 33 whose sizes are such that each pinion 33 has its teeth in mesh with those of the or each neighboring pinion in the single row of twelve such pinions 33. With this arrangement, each pinion 33, shaft 2 and soil working member 3 will rotate, during operation, in the opposite direction to the or each immediately neighboring similar assembly, the directions of operative rotation of four such assemblies being indicated by arrows in FIG. 1 of the drawings. One of the center pair of shafts 2 in the row of twelve shafts has an upward extension through the top of the hollow frame portion 1 into a gear box 34 which is secured in place on top of the hollow frame portion 1. A rotary input shaft of the gearbox 34 projects substantially horizontally forwards from the front thereof and can be placed in driven connection with the rear power take-off shaft of the agricultural tractor or other operating vehicle to which the coupling member or trestle 32 is connected by way of an intermediate telescopic transmission shaft, which is of a construction that is known per se, having universal joints at its opposite ends. This arrangement is illustrated somewhat diagrammatically in FIG. 1 of the drawings. The rear of the gearbox 34 carries a change-speed gear which it is not necessary to describe nor to illustrate in detail for the purpose of the present invention and it suffices to say that the change-speed gear can be employed to vary the transmission ratio between the rotary input shaft of the gearbox 34 and the upward extension of the shaft 2 which is in communication with said gearbox so that the speed of rotation of the soil working members 3 can be increased or decreased, as may be required, without having to change the speed of the drive that is applied to the rotary input shaft of the gearbox 34.

When the described soil cultivating implement is to be employed in the cultivation of an area of land, the working level of the members 3 is adjusted, as previously described, by moving the roller 8 upwardly or downwardly, as may be required, relative to the frame portion 1 employing the locking bolts 7 to maintain a selected depth setting of the soil working members 3 as long as may be needed. The change-speed gear at the rear of the gearbox 34 is also, if required, adjusted to increase or decrease the speed of rotation of the soil working members 3 in response to a substantially standard driving speed of rotation that is applied to the leading end of the rotary input shaft of the gearbox 34. The coupling member or trestle 32 of the implement is connected to the three-point lifting device or hitch of the co-operating agricultural tractor or other operating vehicle having a rear power take-off shaft which is employed to drive the soil working members 3 and, as the implement moves operatively in the direction A over land that is to be cultivated, the twelve (in this embodiment) rotary soil working members 3 revolve in the directions indicated by the arrows in FIG. 1 of the drawings and work individual but overlapping strips of soil to produce a single broad strip of cultivated land having, in this embodiment, a total width of substantially three meters. In addition to performing its depth-control and supporting functions, the open-work cage-formation ground roller 8 acts, in its own right, as a soil working member and will tend to crush any lumps of unbroken soil that are exceptionally left on, or close to, the surface of the ground after treatment by the tines of the immediately foregoing soil working members 3. The roller 8 also performs a soil smoothing and gently compressing action so that, in very many cases, the cultivated soil can be brought to a condition which is suitable for the introduction of seeds or small plants by only a single traverse of the implement. The cultivated soil will generally be in a homogeneously crumbled condition but it will be remembered that the number of auxiliary elongate elements 14 which is employed in the roller 8, if any, will be dependent upon the good judgement of the operator in the light of the nature and condition of the particular soil that is under cultivation.

The guide elements or blades 29 or 31 which are located at the backs of the side plates 26 or 30, with respect to the direction A, act to level out any soil ridges which are formed by digging penetration of the opposite ends of the roller 8 into the ground so that, in conjunction with the side plates 26 or 30 themselves, which already minimize ridging, very little, if any, soil ridging will be produced at the margins of the broad strip of ground that is worked by the implement. Generally speaking, as discussed above, the lighter and drier the soil that is to be dealt with, the greater the number of elongate elements there should be in the skeletal cylindrically curved surface of the roller 8 and, under such conditions, the maximum number of six, or less, of the auxiliary elongate elements 14 can very quickly and easily be installed as described above, their removal being an equally simple and rapid undertaking when the implement is to deal with heavier soil or soil that has a higher moisture content or both. Provided that they are maintained in a substantially undamaged condition, the auxiliary elements 14 can always be quickly and easily installed in the roller 8 since, by employing some degree of resilient stress before engaging the retaining pins 21 or equivalent single bolts, all or most of the corresponding stop lugs 24 will be pre-stressed into resilient engagement with the matchingly shaped peripheral recesses of the carrier discs 9.

Having disclosed our invention, what we claim as new and secure by Letters Patent of the United States is:

1. A soil cultivating implement comprising a plurality of soil working members that are arranged in a transverse row in side-by-side relationship, drive means connected to rotate said soil working members about upwardly extending shafts that define axes of rotation for said soil working members, an elongated ground engaging roller being positioned to the rear of said soil working members, said roller extending across the working width of said row of members, a side-plate being positioned adjacent an outer end of said row to arrest the lateral movement of worked soil, said side-plate being connected to the implement, soil guide means being positioned adjacent the rear of said side-plate and at least a part of said guide means extending towards an outer end of said roller, said guide means including an upper portion that is detachably connected to said side-plate and a lower blade that is inclined to said side plate and normally positioned adjacent the ground and between a lateral end of the roller and the rear of said side-plate, and an upper spring portion that spring-loads said guide means and is detachably connected to the rear of said side-plate, said blade being attached to the lower end of said spring portion and inclined to that portion.

2. An implement as claimed in claim 1 wherein said side-plate is connected to a frame for said working members in a manner to be relatively movable in a substantially vertical plane relative to said frame.

3. An implement as claimed in claim 1 wherein said side-plate comprises slide means along its lower edge which slides along the ground, the lowest part of said guide means being slightly higher than the bottom of the lower edge of said slide means where it slides along the ground.

4. A soil cultivating implement comprising a frame and a plurality of soil working members that are arranged in a transverse row in side-by-side relationship along the length of an elongated portion of said frame, drive means connected to rotate said soil working members about upwardly extending shafts that define axes of rotation for said soil working members, an elongated ground engaging roller being positioned to the rear of said soil working members, said roller extending substantially across the entire working width of said row of members, an upwardly extending side-plate being positioned adjacent an outer end of said row to cooperate with an adjacent said soil working member, said side-plate being pivoted to the frame portion, a spring-loaded soil guide element being detachably connected to the side-plate and positioned adjacent the rear thereof, a lower part of said guide element extending from the side-plate inwardly and towards an outer end of said roller, said guide element comprising a blade that is connected to the rear of said side-plate, said blade having a plane inclined from the horizontal at an angle of at least sixty degrees.

5. An implement as claimed in claim 4 wherein said side-plate is pivoted to said frame portion in a manner to be relatively movable in a substantially vertical plane relative to said frame portion.

6. An implement as claimed in claim 4 wherein said side-plate comprises slide means along its lower edge which slides along the ground, the lowest part of said guide element being slightly higher than the bottom of the lower edge of said slide means where it slides along the ground.

* * * * *